(12) United States Patent
Mangold

(10) Patent No.: US 7,130,911 B2
(45) Date of Patent: Oct. 31, 2006

(54) METHOD FOR MONITORING UNAUTHORIZED ACCESS TO DATA STORED IN MEMORY BUFFERS

(75) Inventor: Richard P. Mangold, Forest Grove, OR (US)

(73) Assignee: Intel Corporation, Santa Clara, CA (US)

( * ) Notice: Subject to any disclaimer, the term of this patent is extended or adjusted under 35 U.S.C. 154(b) by 734 days.

(21) Appl. No.: 10/074,554

(22) Filed: Feb. 11, 2002

(65) Prior Publication Data

US 2003/0154295 A1 Aug. 14, 2003

(51) Int. Cl.
*G06F 15/16* (2006.01)
*H04N 7/167* (2006.01)

(52) U.S. Cl. ........................ 709/229; 380/239
(58) Field of Classification Search ............... 380/200, 380/210, 240, 250, 239, 227; 709/224, 232, 709/225, 229
See application file for complete search history.

(56) References Cited

U.S. PATENT DOCUMENTS

| | | | |
|---|---|---|---|
| 4,525,599 A | 6/1985 | Curran et al. | |
| 5,883,958 A | 3/1999 | Ishiguro et al. | |
| 6,016,348 A | 1/2000 | Blatter et al. | |
| 6,055,314 A | 4/2000 | Spies et al. | |
| 6,321,314 B1 | 11/2001 | Van Dyke | |
| 6,339,816 B1 | 1/2002 | Bausch | |
| 6,853,731 B1 * | 2/2005 | Boyle et al. | 380/268 |
| 2001/0003195 A1 | 6/2001 | Kajimoto | |

OTHER PUBLICATIONS

Kunkelman T. et al. "Evaluation of Different Video Encryption Methods for a Secure MultiMedia Conferencing Gateway" Lecture notes in computer science, Springer Verlang, New York, NY, US 1997, pp. 75-89.
PCT International Search Report, PCT/US01/50659, Apr. 8, 2003.
Privacy. Oakland, May 1-3, 1989, Washington, IEEE Comp. Soc. Press, US May 1, 1989.
PCT Search Report, PCT?US03,02048, mailed Jan. 24, 2005.

\* cited by examiner

*Primary Examiner*—Krisna Lim
(74) *Attorney, Agent, or Firm*—Blakely, Sokoloff, Taylor & Zafman LLP

(57) ABSTRACT

According to one embodiment, a method is disclosed. The method includes receiving video data at an application program, receiving the video data to one or more memory buffers, decrypting the video data, and monitoring page table entries corresponding to the memory buffers to determine whether a second application program has accessed the memory buffers.

20 Claims, 4 Drawing Sheets

METHOD FOR MONITORING UNAUTHORIZED ACCESS TO DATA STORED IN MEMORY BUFFERS

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

FIELD OF THE INVENTION

The present invention relates to computer systems; more particularly, the present invention relates to the protection of data on a computer system.

BACKGROUND

Widespread use of the Internet and electronic mail (e-mail) has left millions of personal computers (PCs) vulnerable to downloaded viruses and other types of malicious software that can destroy programs, copy and upload private documents, and perform other harmful acts, frequently without the PC operator's knowledge. The increasing popularity of downloaded programs has multiplied the problem significantly, since such programs create more opportunities to unknowingly download the malicious software.

Due to their open architecture, most PCs provide very little protection against such destructive software. It is this very openness that has made the PC platform the general-purpose solution provider that it is. Other types of computers are also vulnerable to such attacks in varying degrees, but the pervasive use of PCs has drawn much attention to the problem as it applies to PCs.

In the past, owners of copyrighted information or other intellectual property have been reluctant to allow their property to be viewed on the PC platform (books, movies, sensitive corporate documents, etc.) as the nature of the open PC platform makes the property vulnerable to mischievous software that may run in the background. Although self-replicating destructive software (viruses) attracts the most attention, copyright owners are more concerned with the illegal copying and distribution of any document that they permit to be downloaded to a computer. This is particularly true of video that is available electronically by downloading over a network such as the Internet, or service provider networks. The ease of copying downloaded video makes it easy to illicitly reproduce and forward copyrighted materials without detection of this activity by the copyright owner.

BRIEF DESCRIPTION OF THE DRAWINGS

The present invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

Figure 1:
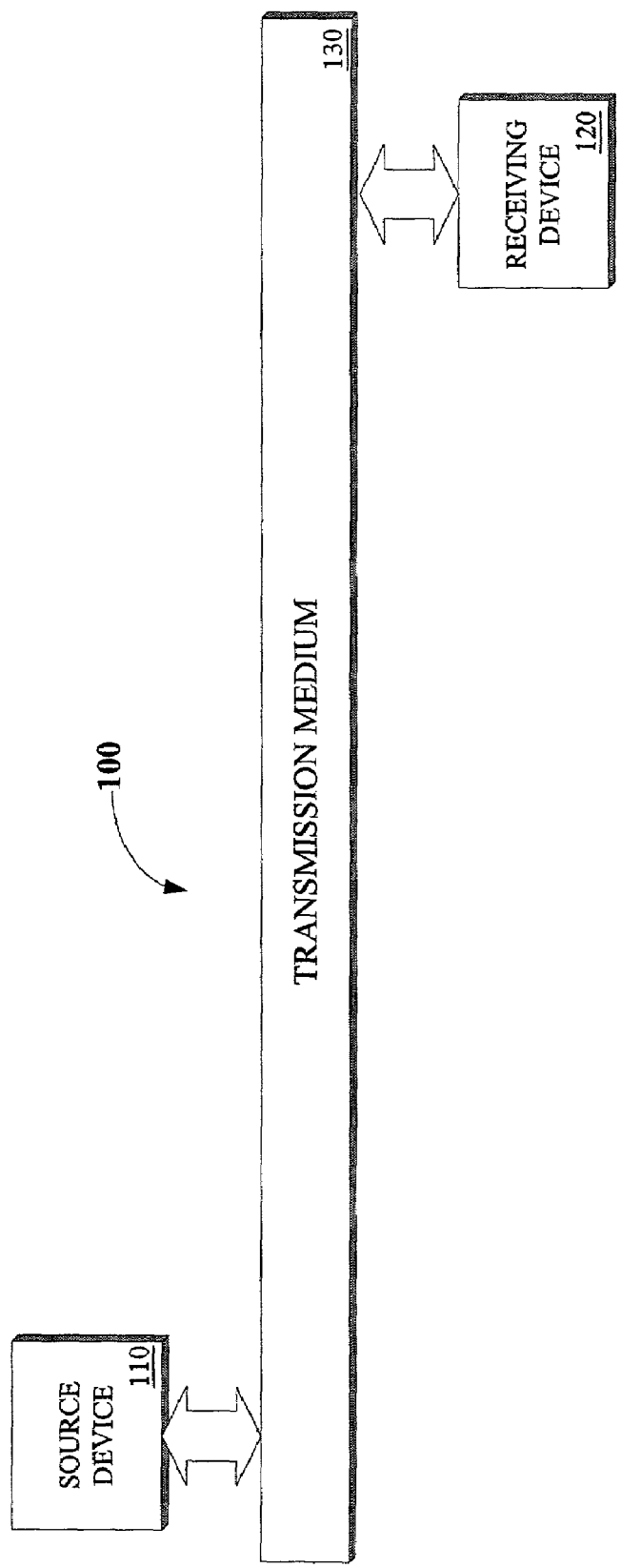
FIG. 1 illustrates one embodiment of a network.

A method for protecting memory buffers from unauthorized access by user level applications is described. According to one embodiment, an application program receives video content from a content source. The application calls an application level interface to receive the video content. The interface receives and transmits the video content to allocated memory buffers.

Subsequently, the content of the buffers is passed to a decryption module via the interface. The decryption module decrypts the video content and modifies a page table entry (PTE) corresponding to the memory buffers in order to dear the accessed bit from the PTE. The decrypted contents of the buffers are then transmitted back to the interface.

According to one embodiment, the decryption module verifies that the interface has a digital signature that was signed by an authority allowing it access to the decryption module. Once the content has been returned to the interface, the interface sets up a transfer with a video decoder in order to transmit the video content.

Subsequently, the decryption module monitors the PTEs. Afterwards, it is determined whether the decryption module 340 has been notified by the interface to release the buffers. If the decryption module has been notified, the buffers are released. Otherwise, the decryption module continues to monitor the buffers.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

In the following description, numerous details are set forth. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result.

The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

The instructions of the programming language(s) may be executed by one or more processing devices (e.g., processors, controllers, control processing units (CPUs), execution cores, etc.).

FIG. 1 illustrates one embodiment of a network 100. Network 100 includes a computer system 110 and a computer system 120 coupled via a transmission medium 130. In one embodiment, computer system 110 operates as a source device that sends an object to computer system 120, operating as a receiving device. The object may be, for example, a video file, a data file, an executable, or other digital objects. The object is sent via data transmission medium 130.

The data transmission medium 130 may be one of many mediums such as a satellite transmission, an internal network connection, an Internet connection, or other connections. The transmission medium 130 may be connected to a plurality of untrusted routers (not shown) and switches (not shown).

According to one embodiment, computer system 110 is a server computer, while computer system 120 is a client set-top appliance. In a further embodiment, the set-top appliance is implemented for cable television or digital satellite services that receive audio and video content from computer system 110. However, in other embodiments, computer system 120 may be a personal computer (PC) coupled to computer system 110, wherein the transmission medium is the Internet.

Figure 2:
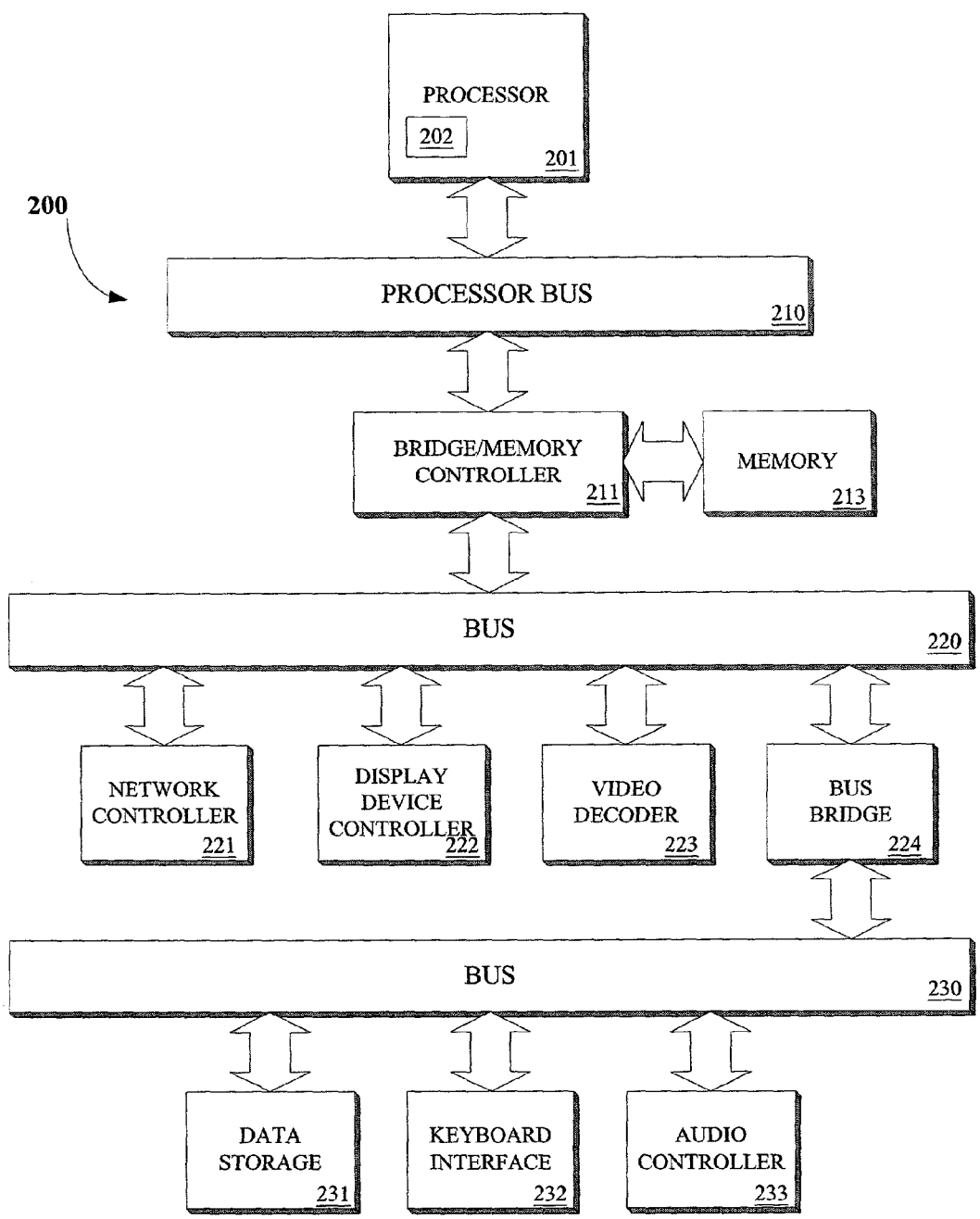
FIG. 2 is a block diagram of one embodiment of a computer system.

FIG. 2 is a block diagram of one embodiment of a computer system 200. Computer system 200 may be implemented as computer system 120 (both shown in FIG. 1). The computer system 200 includes a processor 201 that processes data signals. Processor 201 may be a complex instruction set computer (CISC) microprocessor, a reduced instruction set computing (RISC) microprocessor, a very long instruction word (VLIW) microprocessor, a processor implementing a combination of instruction sets, or other processor device.

In one embodiment, processor 201 is a processor in the Pentium® family of processors including the Pentium® II family and mobile Pentium® and Pentium® II processors available from Intel Corporation of Santa Clara, Calif. Alternatively, other processors may be used. FIG. 2 shows an example of a computer system 200 employing a single processor computer. However, one of ordinary skill in the art will appreciate that computer system 200 may be implemented using multiple processors.

Processor 201 is coupled to a processor bus 210. Processor bus 210 transmits data signals between processor 201 and other components in computer system 200. Computer system 200 also includes a memory 213. In one embodiment, memory 213 is a dynamic random access memory (DRAM) device. However, in other embodiments, memory 213 may be a static random access memory (SRAM) device, or other memory device.

Memory 213 may store instructions and code represented by data signals that may be executed by processor 201. According to one embodiment, a cache memory 202 resides within processor 201 and stores data signals that are also stored in memory 213. Cache 202 speeds up memory accesses by processor 201 by taking advantage of its locality of access. In another embodiment, cache 202 resides external to processor 201.

Computer system 200 further comprises a bridge memory controller 211 coupled to processor bus 210 and memory 213. Bridge/memory controller 211 directs data signals between processor 201, memory 213, and other components in computer system 200 and bridges the data signals between processor bus 210, memory 213, and a first input/output (I/O) bus 220.

In one embodiment, I/O bus 220 may be a single bus or a combination of multiple buses. In a further embodiment, I/O bus 220 may be a Peripheral Component Interconnect adhering to a Specification Revision 2.1 bus developed by the PCI Special Interest Group of Portland, Oreg. In another embodiment, I/O bus 220 may be a Personal Computer Memory Card International Association (PCMCIA) bus developed by the PCMCIA of San Jose, Calif. Alternatively, other busses may be used to implement I/O bus. I/O bus 220 provides communication links between components in computer system 200.

A network controller 221 is coupled I/O bus 220. Network controller 221 links computer system 200 to a network of computers (not shown in FIG. 2) and supports communication among the machines. In one embodiment, computer system 200 receives streaming video data from a computer 110 via network controller 221.

A display device controller 222 is also coupled to I/O bus 220. Display device controller 222 allows coupling of a display device to computer system 200, and acts as an interface between the display device and computer system 200. In one embodiment, display device controller 222 is a monochrome display adapter (MDA) card.

In other embodiments, display device controller 222 may be a color graphics adapter (CGA) card, an enhanced graphics adapter (EGA) card, an extended graphics array (XGA) card or other display device controller. The display device may be a television set, a computer monitor, a flat panel display or other display device. The display device receives data signals from processor 201 through display device controller 222 and displays the information and data signals to the user of computer system 200.

A video decoder 223 is also coupled to I/O bus 220. Video decoder 223 is a hardware device that translates received encoded data into its original format. According to one embodiment, video decoder 223 is a Moving Picture Expert Group 4 (MPEG-4) decoder. However, one of ordinary skill in the art will appreciate that video decoder 223 may be implemented with other types of MPEG decoders.

Computer system 200 also includes a second I/O bus 230 coupled to I/O bus 220 via a bus bridge 224. Bus bridge 224 operates to buffer and bridge data signals between I/O bus 220 and I/O bus 230. I/O bus 230 may be a single bus or a combination of multiple buses. In one embodiment, I/O bus 230 is an Industry Standard Architecture (ISA) Specification Revision 1.0a bus developed by International Business Machines of Armonk, N.Y. However, other bus standards may also be used, for example Extended Industry Standard Architecture (EISA) Specification Revision 3.12 developed by Compaq Computer, et al.

I/O bus 230 provides communication links between components in computer system 200. A data storage device 231 is coupled to I/O bus 230. I/O device 231 may be a hard disk drive, a floppy disk drive, a CD-ROM device, a flash memory device or other mass storage device. A keyboard interface 232 is also coupled to I/O bus 230. Keyboard interface 232 may be a keyboard controller or other keyboard interface. In addition, keyboard interface 232 may be a dedicated device or can reside in another device such as a bus controller or other controller. Keyboard interface 232 allows coupling of a keyboard to computer system 200 and transmits data signals from the keyboard to computer system 200. An audio controller is also coupled to I/O bus 230. Audio controller 233 operates to coordinate the recording and playing of sounds.

According to one embodiment, computer system 200 includes a mechanism that secures received video data against unauthorized access. In the protection of high value video content, it is often necessary to restrict access to memory buffers containing the video content once it has been decrypted for playback, at least until a video decoder has accessed the content.

However, there is a latency between the time the content is decrypted and stored in memory buffers, and the time the memory buffers are accessed by the video decoder. Therefore, such latency provides a window of opportunity for an unauthorized application to access the unencrypted content in the memory buffers.

Typically, memory buffers are marked as accessible by applications, or marked as exclusively accessible by the operating system. Nonetheless, in some operating systems it is not possible to protect one application's buffers from being accessed by another application. Thus, a method to protect memory buffers from being accessed by applications that are not authorized to have access to the contents of the buffer is disclosed.

Figure 3:
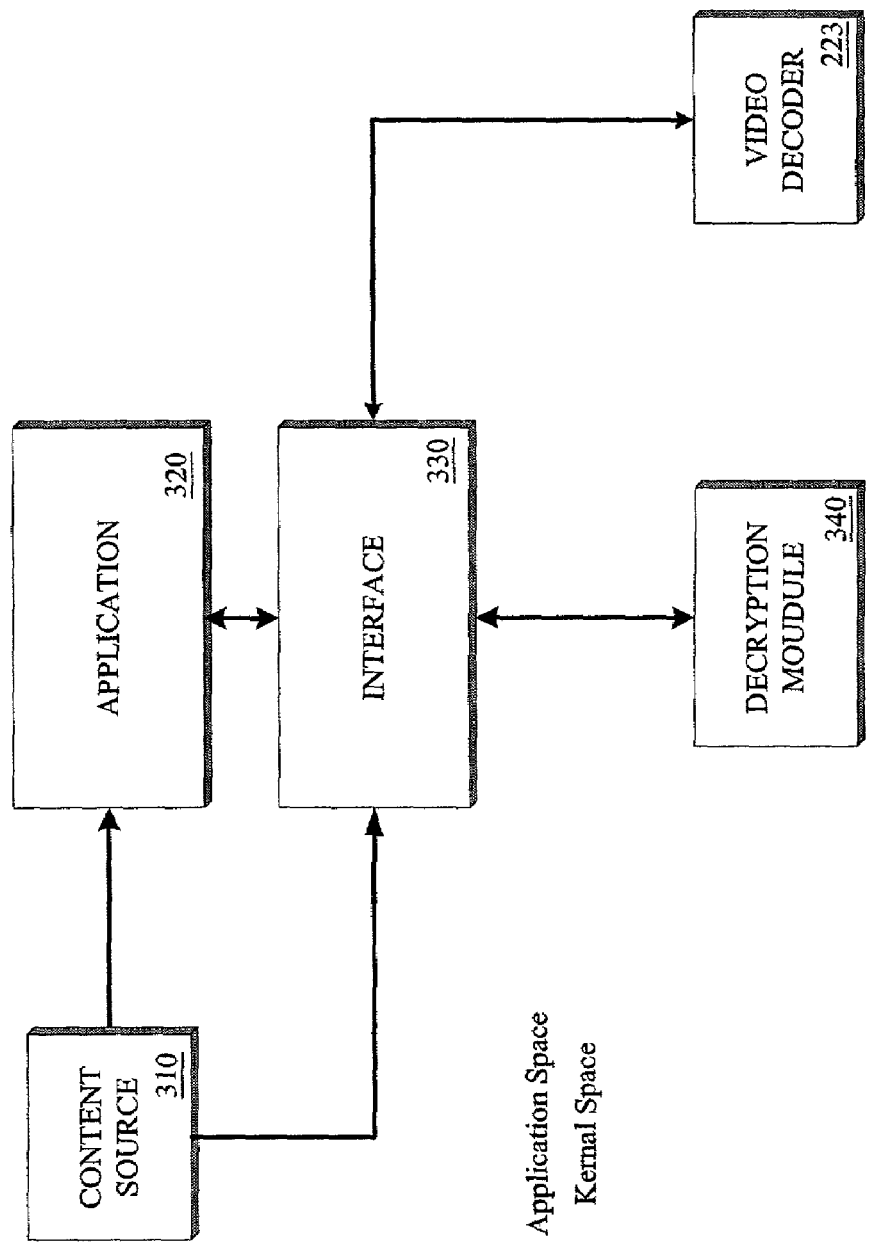
FIG. 3 is a block diagram of one embodiment of a mechanism for protecting memory buffers from unauthorized access.

FIG. 3 is a block diagram of one embodiment of a mechanism to protect memory buffers from unauthorized access. According to one embodiment, the mechanism is implemented at the application space and the kernel space. The application space components include a content source 310, a software application 320 and a software interface 330. The kernel space components include a decryption module 340 and video decoder 223.

Content source 310 transmits digital video content to interface 310. As discussed above, content source 310 may be a public network (e.g., the Internet), or a private network.

In other embodiments, content source 310 may be a DVD, hard disk storage device, or other video source. Software application 320 plays the video content received from content source 310. Software interface 330 serves as an interface between software application 320 and video decoder 223. In particular, interface 330 receives video content from content source 310 and forwards the content to video decoder 223.

In one embodiment, interface 330 receives the video content in its encrypted format. In a further, embodiment, only the data payload is encrypted. Consequently, the parameters accessed by interface 330 (e.g., headers, time stamps, etc.) are not encrypted when received at interface 330. After receiving the content, interface 330 transmits the encrypted payload to memory buffers within memory 213 (FIG. 2) for storage. Therefore, the data is protected from copying while stored in memory.

Decryption module 340 decrypts the video content stored in the memory buffers. According to one embodiment, decryption module 340 is tamper resisted to prevent modification by rogue applications. In a further embodiment, decryption module 340 supports various encryption standards. In yet another embodiment, decryption module 340 clears an accessed bit in the memory page table entry (PTE) immediately after the content is decrypted. Subsequently, decryption module 340 monitors the PTE accessed bit until video decoder 223 has accessed the memory buffer. Once video decoder 223 has accessed the buffer, decryption module erases the memory buffer and stops monitoring the corresponding PTE access bit.

Figure 4:
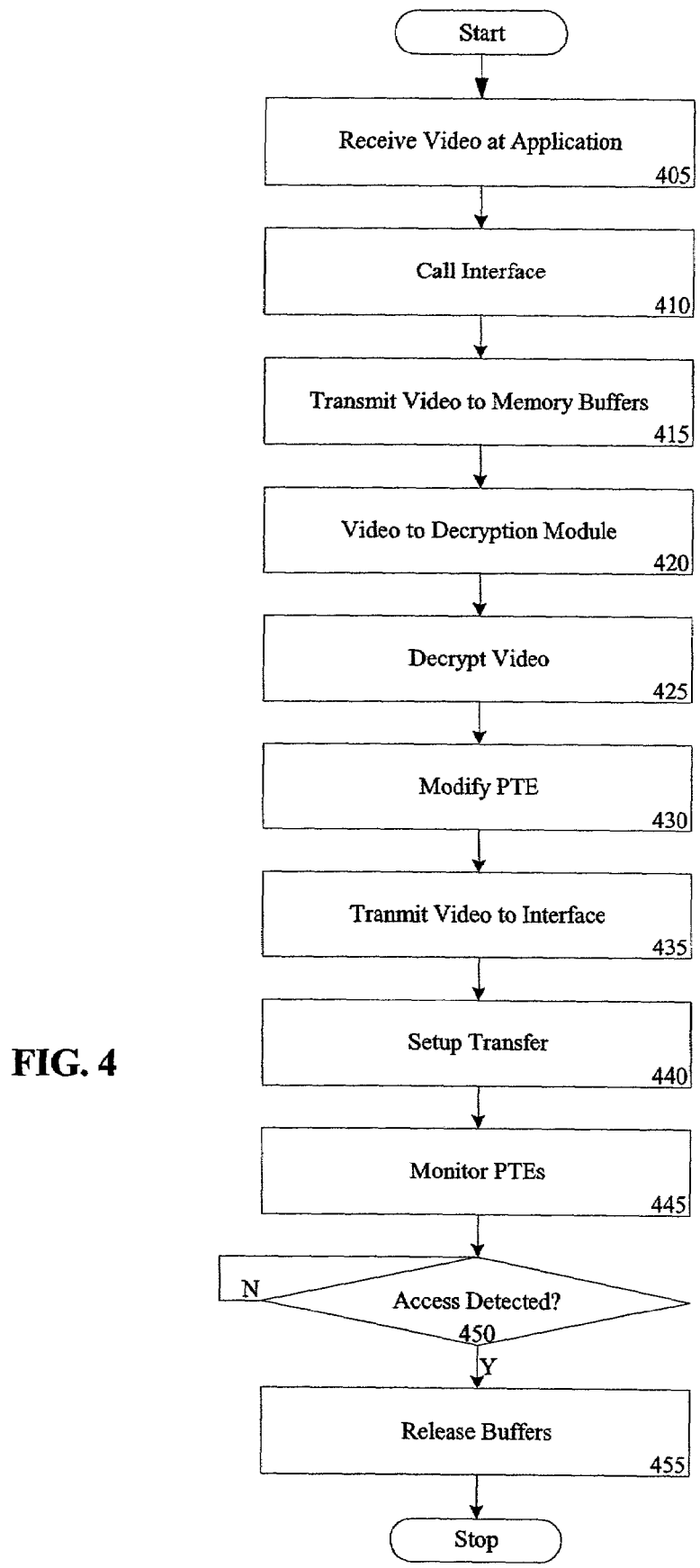
FIG. 4 is a flow diagram for one embodiment of protecting memory buffers from unauthorized access.

FIG. 4 is a flow diagram for one embodiment of protecting memory buffers from unauthorized access. At processing block 405, application 320 begins to receive video content from content source 310. At processing block 410, application 320 calls application level interface 330 to receive the video content. At processing block 415, interface 330 receives and transmits the video content to allocated memory buffers.

At this point the content is encrypted to protect from copying. In one embodiment, the buffers are processed based upon format specific headers that remain unencrypted in order to split different streams (e.g., audio/video/sub-picture) into different buffers if necessary. Once all user level processing is completed, the content of the buffers is passed to decryption module 340 via interface 330, processing block 420.

At processing block 425, decryption module 340 decrypts the video content. At processing block 430, decryption module 340 modifies the PTE corresponding to the memory buffers in order to clear the accessed bit from the PTE. At processing block 435, the decrypted contents of the buffers are transmitted back to interface 330.

According to one embodiment, decryption module 340 verifies that application 320 and interface 330 have a digital signature that was signed by an authority allowing it access to the decryption module. Once the content has been returned to interface 330, interface 330 sets up a transfer with video decoder 223 in order to transmit the video content, processing block 440.

In one embodiment, any access by applications to the memory buffers, at this point, will cause the PTE to mark the buffers as being accessed. Thus, decryption module monitors the PTEs, processing block 445. Monitoring the buffers enables decryption module 340 to detect any memory accesses to the unencrypted buffers by software, and to react appropriately to these accesses.

At decision block 450, it is determined whether decryption module 340 has been notified by the signed interface 330 to release the buffers. If decryption module 340 has been notified, the buffers are released, processing block 455. The buffers are erased upon being released, and the corresponding PTE access bit is no longer monitored. If decryption module 340 has not been notified, decryption module 340 continues to monitor the buffers.

The above-described method and mechanism enables a secure video playback stack to detect accesses to specific memory buffers containing video content during the window of vulnerability (e.g., after decryption but before consumption). In addition, it enables the detection of these accesses without using operating system protection mechanisms. (e.g., does not require modifications to the operating system's paging modules). Thus, the video buffers may be secured during the transition from software, to a hardware video decoder without requiring special encryption being integrated into the hardware decoder.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as the invention.

What is claimed is:

1. A method comprising:
   receiving video data at an application program;
   transmitting the video data to one or more memory buffers;
   decrypting the video data; and
   monitoring a page table entry bit corresponding to each of the one or more memory buffers to determine whether a second application program has accessed the one or more memory buffers.

2. The method of claim 1 further comprising:
   the application program calling an interface upon receiving the video data;
   receiving the video data at the interface; and
   transmitting the video data to the memory buffers.

3. The method of claim 2 wherein the video data is stored at the memory buffers in an encrypted format.

4. The method of claim 2 further comprising:
   transmitting the video data from the memory buffers to the interface;
   transmitting the video data from the interface to a decryption module; and
   decrypting the video data at the decryption module.

5. The method of claim 4 further comprising verifying, at the decryption module, a digital signature of the interface prior to decrypting the video data.

6. The method of claim 4 further comprising the decryption module modifying the page table entries to clear access bits corresponding to the memory buffers.

7. The method of claim 4 further comprising:
   transmitting the decrypted video data to the interface; and
   transmitting the decrypted video data from the interface to the video decoder.

8. The method of claim 1 further comprising:
   receiving a notification at the decryption module to terminate the monitoring of the page table entries; and
   terminating the monitoring of the page table entries.

9. A computer system comprising:
   an application to receive data content;
   a memory device to store the data content;
   a decoder to decode the content; and
   a decryption module to decrypt the data content, and to monitor access to the memory device to determine if memory buffers storing the data content have been accessed by a second application prior to the decoding of the data content.

10. The computer system of claim 9 wherein the decryption module monitors the memory buffers by observing the state of a corresponding access bit in the memory device page table entries.

11. The computer system of claim 10 wherein the decryption module is tamper resistant to prevent modification.

12. The computer system of claim 9 further comprising an interface coupled to the application, the decoder and the decryption module.

13. The computer system of claim 12 wherein the interface receives the data content in an encrypted format.

14. An article of manufacture including one or more computer readable media that embody a program of instructions, wherein the program of instructions, when executed by a processing unit, causes the processing unit to:
   receive video data at an application program;
   transmit the video data to one or more memory buffers
   decrypt the video data; and
   monitor a page table entry bit corresponding to each of the one or more memory buffers to determine whether a second application program has accessed the one or more memory buffers.

15. The article of manufacture of claim 14, wherein the program of instructions, when executed by a processing unit, further causes:
   the application program to call an interface upon receiving the video data;
   receiving the video data at the interface; and
   transmitting the video data to the memory buffers.

16. The article of manufacture of claim 15 wherein the program of instructions, when executed by a processing unit, further causes the processor:
   transmit the video data from the memory buffers to the interface;
   transmit the video data from the interface to a decryption module; and
   decrypt the video data at the decryption module.

17. The article of manufacture of claim 16 wherein the program of instructions, when executed by a processing unit, further causes the processor to verify, at the decryption module, a digital signature of the interface prior to decrypting the video data.

18. The article of manufacture of claim 16 wherein the program of instructions, when executed by a processing unit, further causes the decryption module to modify the page table entries to clear access bits corresponding to the memory buffers.

19. The article of manufacture of claim 16 wherein the program of instructions, when executed by a processing unit, causes the processor to:
   transmit the decrypted video data to the interface; and
   transmit the decrypted video data from the interface to the video decoder.

20. The article of manufacture of claim 14, wherein the program of instructions, when executed by a processing unit, further causes the processor to:
   receive a notification at the decryption module to terminate the monitoring of the page table entries; and
   terminate the monitoring of the page table entries.

* * * * *

UNITED STATES PATENT AND TRADEMARK OFFICE
CERTIFICATE OF CORRECTION

PATENT NO.       : 7,130,911 B2
APPLICATION NO.  : 10/074554
DATED            : October 31, 2006
INVENTOR(S)      : Mangold It is certified that error appears in the above-identified patent and that said Letters Patent is hereby corrected as shown below:

In column 2, at line 16, delete "dear" and insert --clear--.

Signed and Sealed this

Fourth Day of December, 2007

JON W. DUDAS
*Director of the United States Patent and Trademark Office*